United States Patent

[11] 3,547,471

| [72] | Inventor | Paul G. Dunmire |
| | | Oakland, Calif. |
| [21] | Appl. No. | 702,584 |
| [22] | Filed | Feb. 2, 1968 |
| [45] | Patented | Dec. 15, 1970 |
| [73] | Assignee | Christy Metal Products, Inc. |
| | | Emeryville, Calif. |
| | | a corporation of California |

[54] PIPE COUPLING
4 Claims, 3 Drawing Figs.

[52] U.S. Cl..................................................... 285/337,
285/341, 285/369
[51] Int. Cl..................................................... F16l 19/00
[50] Field of Search.......................................... 285/337,
341, 24, 25, 26, 27, 369; 277/11, 101;
137/(Inquired); 251/(Inquired); 285/353, 356

[56] References Cited
UNITED STATES PATENTS

| 1,921,400 | 8/1933 | Weber.......................... | 285/337X |
| 3,010,736 | 11/1961 | Dilley........................... | 285/341X |
| 1,818,493 | 8/1931 | McWane...................... | 285/348X |
| 1,908,844 | 5/1933 | Holtson....................... | 285/348X |

Primary Examiner—David J. Williamowsky
Assistant Examiner—Wayne L. Shedd
Attorney—Flehr, Hohbach, Test, Albritton and Herbert ABSTRACT: A pipe coupling having a cylindrical sleeve which surrounds pipe sections to be joined. Each end of the sleeve is provided with beveled inwardly facing surfaces for forming a wedge-shaped annular recess with the outside wall of the pipe. A gasket is forced into the wedge-shaped recess by a flange member having a wedge-shaped annular ridge. Alignment means are provided for centering the coupling as it is assembled to the pipe.

INVENTOR.
Paul G. Dunmire

PIPE COUPLING

BACKGROUND OF THE INVENTION

This invention relates to pipe couplings and particularly to such couplings which are used for connecting the adjacent ends of pipes without threaded fittings. Heretofore, couplings of this general character generally utilized a coupling sleeve which surrounds the adjacent ends of the pipes to be connected and includes a flange at each end of the sleeve for urging a gasket into radial engagement about the respective pipe end. Such flanges are typically pulled together by bolts extending the length of the sleeve and between the flanges at each end. The tightening of the bolts and movement of each flange forces the gasket into a wedge formed by an inwardly facing recess at the sleeve end and the pipe where it is pressed into a sealing engagement to the closest point of proximity between the sleeve and the pipe. However, it is found that the resistance to leakage between the gasket and pipe is insufficient under adverse conditions.

It is desirable, in the waterworks field, to offer a pipe coupling that will connect pipes of varying outside diameters together without the necessity of changing the flanges and gaskets for each different diameter. Past practices have limited the variance in the outside diameter of pipe that could be connected with a given set of flanges and gaskets to approximately .200 inches, without jeopardizing the ability of the coupling to provide good service. The problem centers around the fact that when a smaller diameter pipe is to be connected, the coupling sleeve drops down onto the top of the pipe, leaving a gap between the sleeve and the bottom of the pipe. Under this condition, when the gasket and flange are assembled, the gasket slips in too far at the bottom, so that insufficient gasket extends out of the sleeve for appropriate take up. The flange can also drop down to leave an excessive gap between the pipe and the pressure face of the flange.

There is, therefore, a need for a new and improved pipe coupling.

SUMMARY OF THE INVENTION

It is a general object of the present invention to provide an improved pipe coupling which will overcome the above named limitations and disadvantages.

Another object of the invention is to provide a pipe coupling of the above character which provides a positive and direct urging of the gasket into sealing contact with each of the sleeve and pipe and which concentrates the pressures exerted by the flange on the gasket against both the pipe and sleeve.

Another object of the invention is to provide a pipe coupling of the above character which is self-aligning so as to be centered with respect to the pipe as it is installed.

In general, the above objects are achieved by providing a pipe coupling including an elongate sleeve having cylindrical ends which surround the pipe and are accordingly provided with an inner diameter that is somewhat larger than the lateral dimension of the pipe. Each end of the sleeve is provided with an inwardly facing recess including a beveled surface of generally frustoconical form. The recess and pipe define a wedge-shaped annular region for receiving a gasket. The gasket is wedge-shaped having a cylindrical inner wall for contacting the pipe and an inclined wall for contacting the beveled surface. The gasket also has an axially facing planar end wall which is engaged by a raised annular ridge or wedge formed on a flange. The ridge or wedge is of comparable dimensions to the wedge-shaped region formed between the sleeve end and the pipe so that closure of the flange to the sleeve causes the wedge to contact the end wall and to impress and grossly deform the gasket into the recess thereby to positively and directly force its inclined wall against the beveled surface of the sleeve and the cylindrical wall against the outer wall of the pipe. Radial expansion of the gasket is restricted by a continuous cylindrical rim provided on the flange and surrounding the gasket.

The gasket and flange are provided with means for aligning and centering the flange and sleeve on pipes having a smaller than standard outside diameter. Such means include outwardly extending centering tabs on the gasket for lifting and centering the flange and inwardly directed positioning fingers on the flange rim which contact and center the sleeve on the pipe, as the flange is brought in.

These and other objects and features of the invention will become apparent from the following description when taken in conjunction with the accompanying drawings.

DESCRIPTION OF A PREFERRED EMBODIMENT

Figure 1:
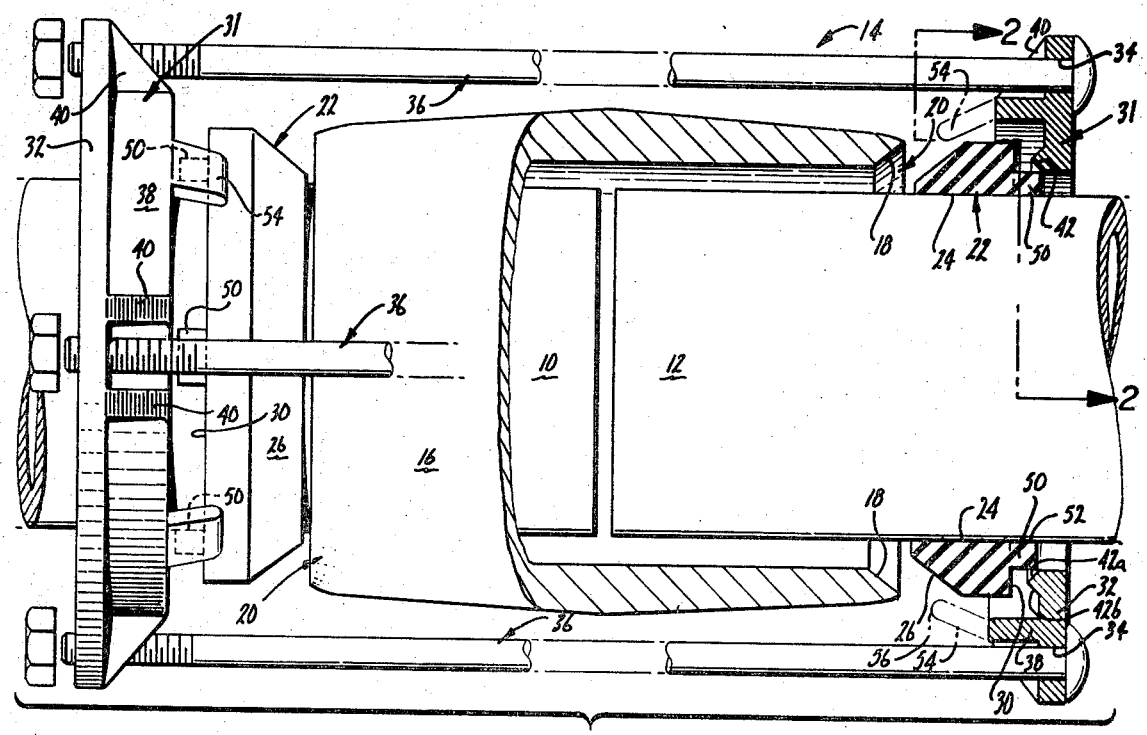
FIG. 1 is a cross-sectional side view with portions shown in section and other portions exploded of a pipe coupling constructed in accordance with the present invention.
Figure 3:
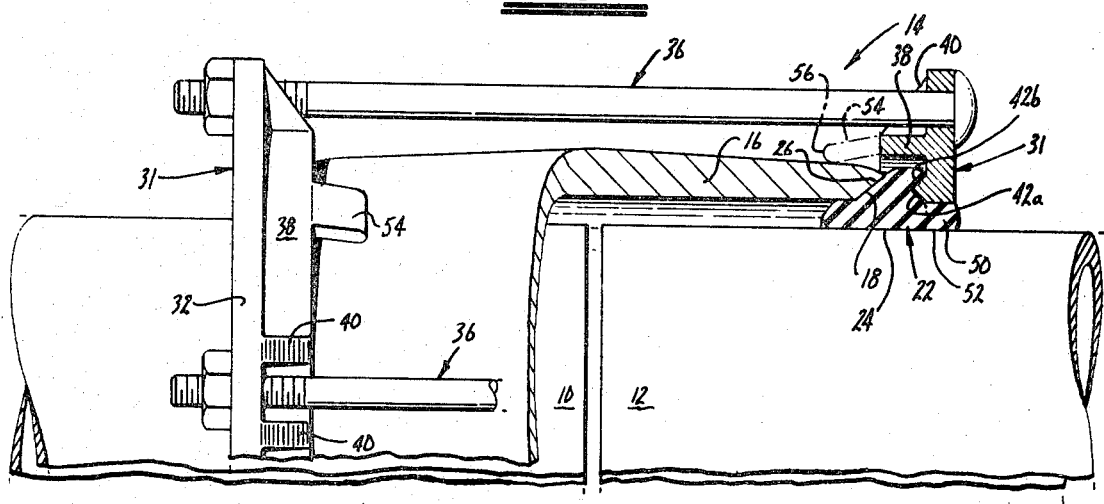
FIG. 3 is a view similar to FIG. 1 showing the coupling after it has been made up on pipe sections.
Figure 2:
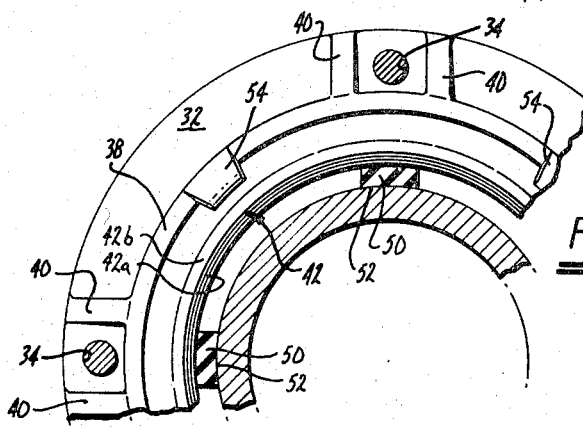
FIG. 2 is a view taken along the lines 2–2 of FIG. 1.

Referring to the drawings, there is shown adjacent ends of pipe sections 10, 12 which it is desired to connect. The pipe coupling 14 of the present invention surrounds the region between the pipe sections and is sealed to the outer walls of sections 10, 12, as hereinafter described. Pipe coupling 14 includes a body or sleeve 16 having portions extending along each of the sections of pipe. Each end of the sleeve terminates in a cylindrical configuration which is somewhat larger than the outer diameter of the respective pipe section so as to be capable of being passed over the same.

Means is provided at each end of the coupling for forming a seal between the end of the sleeve and the outer wall of the pipe. Each of such means is identical in construction so that like parts at each end of the coupling are given like numbers and the description relating to one end will suffice as the description of both. Thus, each end of the sleeve is provided with a recess defined by an inwardly beveled surface 18 which may take any suitable form such as frustoconical. Surface 18 together with the outer wall of the pipe serves to define an annular region or recess 20 of wedge-shaped cross section which tapers down and points inwardly toward the sleeve.

A gasket 22 is adapted to be positioned in region 20 and between the sleeve 16 and the respective ones of pipe sections 10, 12. Gasket 22 has an inner cylindrical wall 24 lying in continuous contact with the outer wall of the pipe section and an outwardly facing inclined wall 26 for contacting the beveled surface 18 at the end of the sleeve. The cross-sectional dimensions of the gasket are such that wedge-shaped region 20 is filled with portions of the gasket extending beyond the sleeve and terminating in a flat end wall 30.

An annular flange 31 is provided for operatively engaging the gasket and includes a generally flat annular portion 32 having a plurality of bolt openings 34 therein. A plurality of bolt means 36 are passed through the openings in both of the flanges and are taken up to move the flanges axially toward each other with respect to sleeve 16. Suitable reinforcing ring 38 and supports 40 are provided for accepting the load developed by the bolts.

The inwardly facing wall of the flange carries an axially directed annular wedge 42 which serves as the primary pressure face of the flange and which has dimensions which are comparable to the wedge-shaped region 20 formed between the sleeve and the pipe. Thus, wedge 42 is provided with inner and outer frustoconical surfaces 42a, 42b which join at an apex spaced away from the plane of the inner face of the flange by a distance of about one-half of the depth of region 20.

As flange 31 is drawn into engagement with th end wall 30 of the gasket, wedge 42 is driven into the end wall causing large scale deformation of portions of the gasket to thereby urge its inclined surface 26 into pressured contact with the surface 18 in a concentrated area and simultaneously urges the lower inwardly facing cylindrical surface 24 into pressured contact in a concentrated area of the outer wall of the pipe. The seal between the pipe and sleeve created thereby is found to be very effective in preventing leaks, especially between the pipe and the gasket, where leakage generally occurs.

Means are provided for aligning and centering the sleeve and flange on pipes having smaller diameters in the range for a particular coupling, and includes a plurality of outwardly extending tabs 50 formed or molded on the end wall 30 of gasket 22. Thus, four such tabs are shown in the present embodiment but more or as few as one could be used as required by the size of pipe being connected. Tabs 50 have lower surfaces 52 which are continuous with surface 24 and are approximately 5/16 inches long and ⅜ inches wide, and approximately as thick in the radial direction as the difference in radius between the smallest and largest pipes to be accommodated. For example, if the variance in pipe outside diameter were about ¼ inch, the tabs should be about ⅛ inch thick.

When the gasket has been positioned on smaller diameter pipe and the flange slid into place, the radially inward facing surface of wedge 42 contacts the tabs and rides up on the tabs to raise and center the flange. If large diameter pipe is used, tabs 50 are merely pushed and deformed into the end wall 30 of the gasket.

Such aligning and centering means also includes a plurality of bendable fingers 54 attached to the rim 38 of the flange between each bolt opening and extending axially toward the end of sleeve 16. Each of the fingers is about ⅜ inches wide and ¼ inch thick and has a rounded nose 56 for engaging the end of the sleeve. As the flange is moved over the gasket and toward coupling engagement with the end of the sleeve, the nose of the lower fingers engage the outer wall at the end of the sleeve to raise the same into centered and aligned position with respect to flange 31.

As bolt means 36 are further taken up, fingers 54 are bent outwardly out of the way while continuing to hold the sleeve centered as the flange pushes the gasket into recess. As a result, flange 31 is aligned by tabs 50 on the gasket and simultaneously itself aligns sleeve 16 through fingers 54 so that a correctly centered, well-aligned assembly of the parts is obtained and the excellent sealing properties of the gasket and wedge design are achieved in practical circumstances with the pipe having slightly different outside diameter.

I claim:

1. In a coupling for joining adjacent ends of cylindrical pipes, a sleeve having cylindrical ends with an inner diameter larger than the outer wall of the pipe, and positioned about such pipe ends, each end of said sleeve being formed with an inwardly facing recess including a beveled surface facing radially inwardly and away from said end and an outer surface tapering toward each end, said recess and pipe serving to form an annular wedge-shaped region tapering down radially inwardly and away from said sleeve end, an annular gasket made of deformable material and having an inner cylindrical wall for contacting said pipe and an outer inclined wall being oriented at approximately the same angle as said beveled surface, said gasket further having an axially facing planar end wall, an annular flange having an axially facing annular wedge portion integral therewith and coaxially thereof for contacting the planar end wall of the gasket in aligned relation dependent upon coaxial alignment of said flange about the axis of said gasket, said wedge portion being further formed with divergent sides respectively tapering radially inwardly and outwardly from an apex spaced away from the plane of the flange, the outwardly divergent surface of the wedge being substantially parallel with said beveled surface to engage the gasket therebetween, said wedge being further positioned to contact said end wall of the gasket and having dimensions comparable to the wedge-shaped region, means for urging said flange axially of the pipe to drive said wedge into the end wall of the gasket to directly expand the gasket radially into said recess and to compress the gasket between said substantially parallel surfaces, thereby to positively and directly urge said inclined wall of the gasket radially outwardly against said beveled surface and said cylindrical wall radially inwardly against the outer wall of the pipe and alignment means comprising axially extending fingers on said flange extending between the flange and sleeve for engaging said tapering outer surface and centering both the flange and wedge portion and the sleeve all with respect to the pipe during assembly so that, as the gasket and flange are installed and the gasket is urged along the pipe into final position, the gasket, flange and sleeve are mutually centered on the pipe to dispose said recess centered uniformly around the periphery of said pipe.

2. A pipe coupling as in claim 1 wherein said wedge or ridge is formed with frustoconical inner and outer surfaces which join at said apex.

3. In a coupling for joining adjacent ends of cylindrical pipes, a sleeve having cylindrical ends with an inner diameter larger than the outer wall of th pipe, and positioned about such pipe ends, each end of said sleeve being formed with inwardly facing recess including a beveled surface facing radially inwardly and away from said end, said recess and pipe serving to form an annular wedge-shaped region tapering down away from said sleeve end, an annular gasket made of deformable material and having an inner cylindrical wall for contacting said pipe and an outer inclined wall for contacting said beveled surface, said inclined wall being oriented at approximately the same angle as said beveled surface, said gasket further having an axially facing planar end wall, an annular flange having an axially facing annular wedge thereon positioned to contact the end wall of the gasket and having dimensions comparable to the wedge-shaped region, means for urging said flange into axial engagement with said sleeve to thereby drive said wedge into contact with the end wall of the gasket and thereby impress and grossly deform the gasket into the recess, thereby to positively and directly urge its inclined wall against the beveled surface and said cylindrical wall against the outer wall of the pipe, and alignment means for centering the flange and sleeve with respect to the pipe so that, as the gasket and flange are installed and the gasket slides along the pipe into final position, the sleeve is centered on the pipe so that said recess is centered evenly above and below said pipe, said alignment means including a plurality of tabs extending outwardly from the end wall of the gasket and adapted to be engaged by said wedge to thereby lift and center said flange.

4. A pipe coupling as in claim 3 wherein said alignment means further includes a plurality of bendable finger means attached to said flange and extending axially toward said sleeve and having surfaces inclined to the outer surface at the end of said sleeve, said fingers being constructed and arranged to engage and support the sleeve in an axial position as the flange is assembled thereto.